United States Patent
Takahashi (10) Patent No.: US 6,811,155 B2
(45) Date of Patent: Nov. 2, 2004

(54) SHAFT SEAL DEVICE (75) Inventor: Hidekazu Takahashi, Sakado (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 10/395,338

(22) Filed: Mar. 25, 2003

(65) Prior Publication Data
US 2003/0178780 A1 Sep. 25, 2003

(30) Foreign Application Priority Data
Mar. 25, 2002 (JP) ........................................ 2002-084168

(51) Int. Cl.[7] .............................................. F16J 15/34
(52) U.S. Cl. ...................................... 277/362; 277/371
(58) Field of Search ................................. 277/361, 362, 277/370, 371

(56) References Cited

U.S. PATENT DOCUMENTS

| | | | | |
|---|---|---|---|---|
| 3,360,272 A | * | 12/1967 | Blom et al. | 277/348 |
| 3,914,072 A | * | 10/1975 | Rowley et al. | 417/423.11 |
| 4,272,084 A | * | 6/1981 | Martinson et al. | 277/365 |
| 4,511,149 A | * | 4/1985 | Wiese | 277/388 |
| 4,586,719 A | * | 5/1986 | Marsi et al. | 277/385 |
| 4,625,977 A | * | 12/1986 | Azibert et al. | 277/361 |
| 5,066,026 A | * | 11/1991 | Heck et al. | 277/400 |
| 5,076,589 A | * | 12/1991 | Marsi | 277/394 |
| 5,217,233 A | * | 6/1993 | Pecht et al. | 277/306 |
| 5,529,315 A | * | 6/1996 | Borrino et al. | 277/352 |
| 5,718,560 A | * | 2/1998 | Lorenzen | 415/47 |
| 5,803,463 A | * | 9/1998 | Brooks et al. | 277/361 |
| 5,927,722 A | * | 7/1999 | Carmody et al. | 277/368 |
| 6,454,268 B1 | * | 9/2002 | Muraki | 277/361 |
| 6,655,693 B2 | * | 12/2003 | Hosanna et al. | 277/358 |

* cited by examiner

Primary Examiner—Alison K. Pickard
(74) Attorney, Agent, or Firm—Arent Fox PLLC (57) ABSTRACT

A primary technical goal of this shaft seal device is to decrease the number of seals by means of a pressure reducing floating ring, to integrate the whole unit and to simplify assembly of the device due to its simplified construction. The seal device disposes a fixed sleeve whose outer diameter surface is fitted to the inner diameter surfaces of a first sleeve and a second sleeve and whose inner diameter surface can be fitted over a rotary shaft, said fixed sleeve and said second sleeve being engaged and joined with each other by means of a connecting means.

14 Claims, 3 Drawing Sheets

SHAFT SEAL DEVICE

BACKGROUND OF THE INVENTION

1. Field of the Invention

This invention relates generally to assembly construction of shaft seal devices. This invention relates especially but not exclusively to the assembly construction of such shaft seal devices for use with a stirrer or the like providing for a seal of a stirred fluid under a high pressure or extremely high pressure.

2. Description of the Related Art

Figure 3:
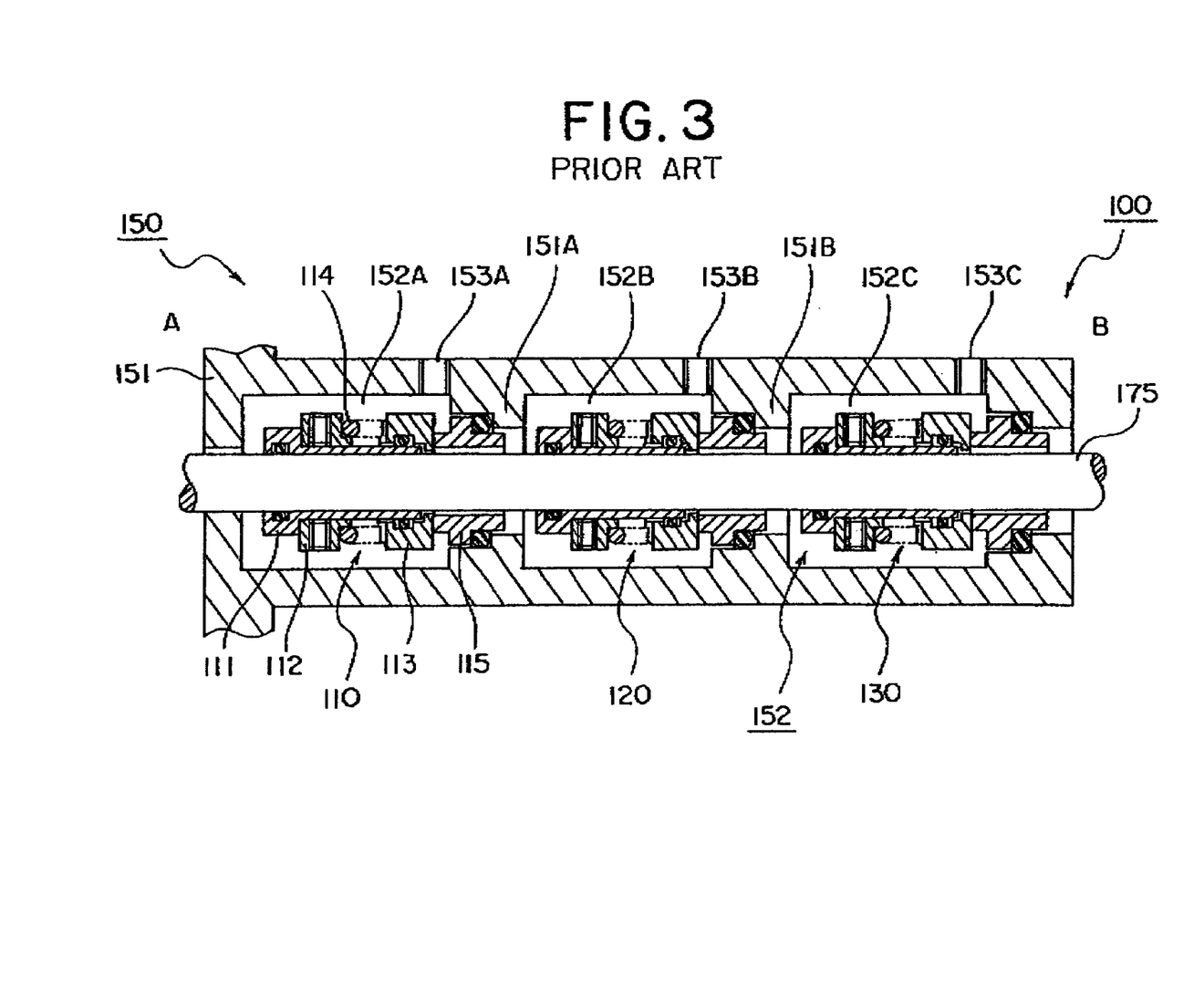
FIG. 3 is a cross sectional view of a shaft seal device of the related art.

A shaft seal device as a relative art of the present invention is illustrated in FIG. 3. FIG. 3 is a half cross-sectional view of a high pressure mechanical seal device.

In FIG. 3, a rotary shaft 175 is supported in a rotary movable manner by a bearing portion, not shown in the figure, which is disposed in a housing 151 of the stirrer 150. The rotary shaft 175 extends throughout the inside and the outside of the housing 151. The inside of the stirrer 150 is filled with a high pressure sealing fluid A.

The housing 151 through which the rotary shaft 175 extends is divided into three chambers 152A, 152B and 152C. The chamber 152 comprises, counted from the sealing fluid A side, a first chamber 152A, a second chamber 152B and a third chamber 152C.

When the pressure of the sealing fluid A is 20 MPa say, a pressure fluid of 15 MPa which is a little lower than that of the fluid A is supplied to the first chamber 152A from a first pipe 153A.

Similarly, a pressure fluid of 10 MPa which is further lower than the pressure of the first chamber 152A is supplied to the second chamber 152B from a second pipe 153B.

Likewise, a pressure fluid of 5 MPa which is yet lower than the pressure of the second chamber 152B is supplied to the third chamber 152C from a third pipe 153C. Therefore, a plurality of chambers 152A, 152B, 152C are disposed in such a manner that the high pressure of the sealing fluid A is decreased step by step.

Without such a means, a high pressure directly acts on a first mechanical seal device 110 and may cause a damage to the device 110.

The first chamber 152A, second chamber 152B and third chamber 152C contain respective mechanical seal devices 110, 120, 130 inside, and these mechanical seal devices 110, 120, 130 are referred to, from the sealing fluid A side towards the atmospheric region, a first mechanical seal 110, a second mechanical seal 120 and a third mechanical seal 130, respectively.

The first mechanical seal 110 is a high pressure mechanical seal due to a high pressure nature of the sealing fluid A. Likewise, high pressure mechanical seals are used for the second mechanical seal 130 as well as the third mechanical seal 120 in accordance with a level of the pressure to which they are subjected.

Sealing fluid A used in a stirrer 150, in general, undergoes a high pressure, and mechanical seal devices 110, 120, 130 are typically employed because elastic rubber seals cannot sustain such a high pressure.

These mechanical seals 110, 120, 130 are specifically prepared for such a high pressure, and they are mounted in such a way that a shaft sleeve 111 is fitted over the rotary shaft 175 via an O-ring. A spring support 112 engages the sleeve 111 at the shoulder part of the sleeve 111, and a rotary seal ring 113 is fitted to the other end of the sleeve 111 in a movable manner via an O-ring. A biasing spring 114 supported by the spring support 112 is disposed to exert an urging force to the rotary seal ring 113.

On the other hand, a stationary seal ring 115 is fitted to a retaining portion of the housing 151 via an O-ring which has an opposing seal face making a sealing contact with the slidable seal face of the rotary seal ring 113.

The second mechanical seal 120 and the third mechanical seal 130 are constructed in a similar manner to the first mechanical seal 110 although some symbols are omitted in the figure.

The first mechanical seal 110 effectively seals the high pressure sealing fluid A within the stirrer in cooperation with the fluid pressure within the first chamber 152A which is a little lower than the pressure of the fluid A.

Likewise for the second mechanical seal 120, it seals the pressure fluid within the first chamber 152A in cooperation with the fluid pressure within the second chamber 152B which is two-step lower than the pressure of the fluid A.

Similarly, the third mechanical seal 130, it seals the pressure fluid within the first chamber 152B in cooperation with the fluid pressure within the second chamber 152C which is three-step lower than the pressure of the fluid A.

Use of such pressure resistive mechanical seals, which reduce the fluid pressure in a stepwise manner from chamber to chamber, is essential to provide a secure seal for the sealing fluid A under a high pressure. In other words, when sealing a high pressure fluid, without a plurality of mechanical seals gradually reducing the high pressure in multiple steps, a single mechanical seal device cannot sustain such a high fluid pressure and will be worn out or damaged at its early stage.

In such a multiple step mechanical seal device 100, the inner diameter of step shoulders 151A, 151B, 151C, which receive the stationary seal rings 115, is formed larger than any of the outer diameters of the stationary seal rings 115, the rotary seal ring 113 and the spring support 112. Thus, it will be difficult to dispose the mechanical seals 110, 120, 130 in the respective chambers 152A, 152B, 152C as illustrated in FIG. 3.

Therefore, disposition of the mechanical seals 110, 120, 130 requires the housing 151 to be split into two pieces along the axial direction relative to the rotary shaft 175, and the mechanical seals 110, 120, 130 need to be assembled by being inserted along the axial direction relative to the rotary shaft 175 in order for the seals to be disposed in respective chambers 152A, 152B, 152C.

However, splitting the housing 151 along the axial direction relative to the rotary shaft 175 prevents O-rings or the like from being used and sealing of the split faces will be made difficult. In case of sealing a high pressure seal fluid, in particular, the high fluid pressure creates an undesirable gap between the split faces.

Furthermore, splitting the housing 151 axially makes it difficult to align the stationary seal ring 115 with respect to the rotary seal shaft 175. This will cause a trouble to the seal performance of the stationary seal ring 115. In particular, the more mechanical seals 110, 120, 130 are involved to reduce the pressure, the more serious these troubles become likely.

Use of such multi-step mechanical seals 110, 120, 130 will result in a high production cost due to difficulties in their fabrication process as well as the assembly process.

The present invention is introduced to resolve the above mentioned problems. A primary technical goal which this invention tries to achieve is to provide a mechanical seal device at a reasonable cost while avoiding a total cost increase of a shaft seal device which is caused by employing a plurality of expensive mechanical seals.

Another goal for the present invention is to reduce an assembly cost of the shaft seal device.

Sealing a high pressure fluid by means of a plurality of seal devices will lead to a large construction because of requirement of many chambers to retain them. Therefore, yet another goal of the present invention is to reduce the size of the shaft seal device by making the installation space compact.

SUMMARY OF THE INVENTION

A primary object of the present invention is to resolve the above mentioned technical problems, and a solution to such problems is embodied as follows.

A preferred shaft seal device in accordance with the principles of the present first invention is a shaft seal device for providing a seal against a process fluid between a housing and a rotary shaft, the shaft seal device comprising:

- a first seal portion which is located within the device and comprises a stationary seal ring retained in the housing and a rotary seal ring making a sealing contact with the stationary seal ring;
- a first sleeve which has a large diameter surface by which the rotary seal ring is retained;
- a second sleeve which retains a large diameter surface and is located on the opposite side of the process fluid relative to the first sleeve;
- a second seal portion which comprises a rotary seal ring retained in the large diameter surface of the second sleeve and a stationary seal ring making a sealing contact with the rotary seal ring;
- a fixed sleeve which retains an outer diameter surface and an inner diameter in which the outer diameter surface is fitted with the inner diameter surface of the first sleeve and the second sleeve and the inner diameter surface is fitted over the rotary shaft; and
- a connecting means which is disposed, respectively, in the fixed sleeve and the second sleeve by which the two sleeves are joined with each other.

In the shaft seal device of the first invention related to the preferred embodiment, the first seal portion is installed on the fit surface between the first sleeve and the first housing, and the first sleeve is fitted to the fixed sleeve.

Next, the second sleeve is fitted to and joined with the fixed sleeve after mounting the second seal portion between the second sleeve and the second housing. Thus, the first sleeve and the second sleeve are retained via the fixed sleeve, and the first seal portion and the second seal portion are assembled between the individual sleeves and the housings to be integrated as a whole unit of shaft seal device. The inner diameter surface of the fixed sleeve is further fitted to the rotary shaft to complete the assembly of the shaft seal device onto the machine apparatus. Therefore, the assembly process as a whole is very simple and its assembly cost will be decreased.

When the shaft seal device needs to be disassembled in case of a trouble, a repair work or the like, loosening and disengaging the connecting means will separate the first seal portion and the second seal portion. Also being able to simplify a mounting construction of the first seal portion and the second seal portion will simplify a design process for the seal device.

A preferred shaft seal device in accordance with the principles of the present second invention is a shaft seal device for providing a seal against a process fluid between a housing and a rotary shaft, the shaft seal device comprising:

- a first seal portion being located inwardly relative to an apparatus which contains a fluid and comprising a stationary seal ring retained in the housing and a rotary seal ring for making a sealing engagement relative to the rotary seal ring;
- a first sleeve having a large diameter surface by which the rotary seal ring is retained;
- a second sleeve having a large diameter surface and being located in the opposite side of the process fluid relative to the first sleeve;
- a second seal portion comprising a rotary seal ring retained in the large diameter surface of the second sleeve;
- a floating ring being located within a fluid chamber between the first seal portion and the second seal portion for reducing a pressure;
- a third sleeve being located in the opposite side of the process fluid relative to the second sleeve and supporting a bearing;
- a fixed sleeve having an outer diameter surface and an inner diameter surface, the outer diameter surface being fitted with inner diameter surfaces of the first sleeve and the second sleeve and the third sleeve and the inner diameter surface of the fixed sleeve being fitted over the rotary shaft; and
- a connecting means being disposed, respectively, in the fixed sleeve and the second sleeve by which the two sleeves are joined relative to each other.

In the shaft seal device of the second invention related to the preferred embodiment, the first seal portion is installed on the fit surface between the first sleeve and the first housing, and the first sleeve is fitted to the fixed sleeve.

The floating ring for reducing pressure is disposed within a fluid chamber between the third housing and the fourth housing, and the floating ring and the housings containing the floating ring are fitted over the first sleeve.

The second sleeve is further fitted to and joined with the fixed sleeve after mounting the second seal portion between the second sleeve and the second housing.

The fifth and the sixth housings inside of which a bearing unit is installed are fitted to the third sleeve, and the third sleeve is fitted to and joined with the fixed sleeve by means of the connecting means. Thus, the first sleeve and the second sleeve are fittingly retained via the fixed sleeve, and the first seal portion and the second seal portion are assembled between the individual sleeves and the housings to be integrated as a whole unit of shaft seal device. Inner diameter surface of the fixed sleeve is further fitted to the rotary shaft to complete the assembly of the shaft seal device onto the machine apparatus.

Therefore, the entire shaft seal device will become compact as an integral unit. Disassembly can also be easily done by disengaging the connecting means, and its total assembly cost will be decreased.

Use of the floating ring for pressure reduction enables it to seal the process fluid with a small number of seals like the first seal portion and the second seal portion. Therefore, the number of seals will be decreased and a structure of the shaft seal device is not only simplified, but also an assembly of the entire device is made easy. Also the entire device can be integrated as a sub-assembled part.

DETAILED DESCRIPTION OF THE INVENTION

Described below is details of the figures of preferred embodiments of a shaft seal device constructed in accordance with the principles of the present invention. All the figures explained below are constructed according to actual design drawings with accurate dimensional relations.

Figure 1:
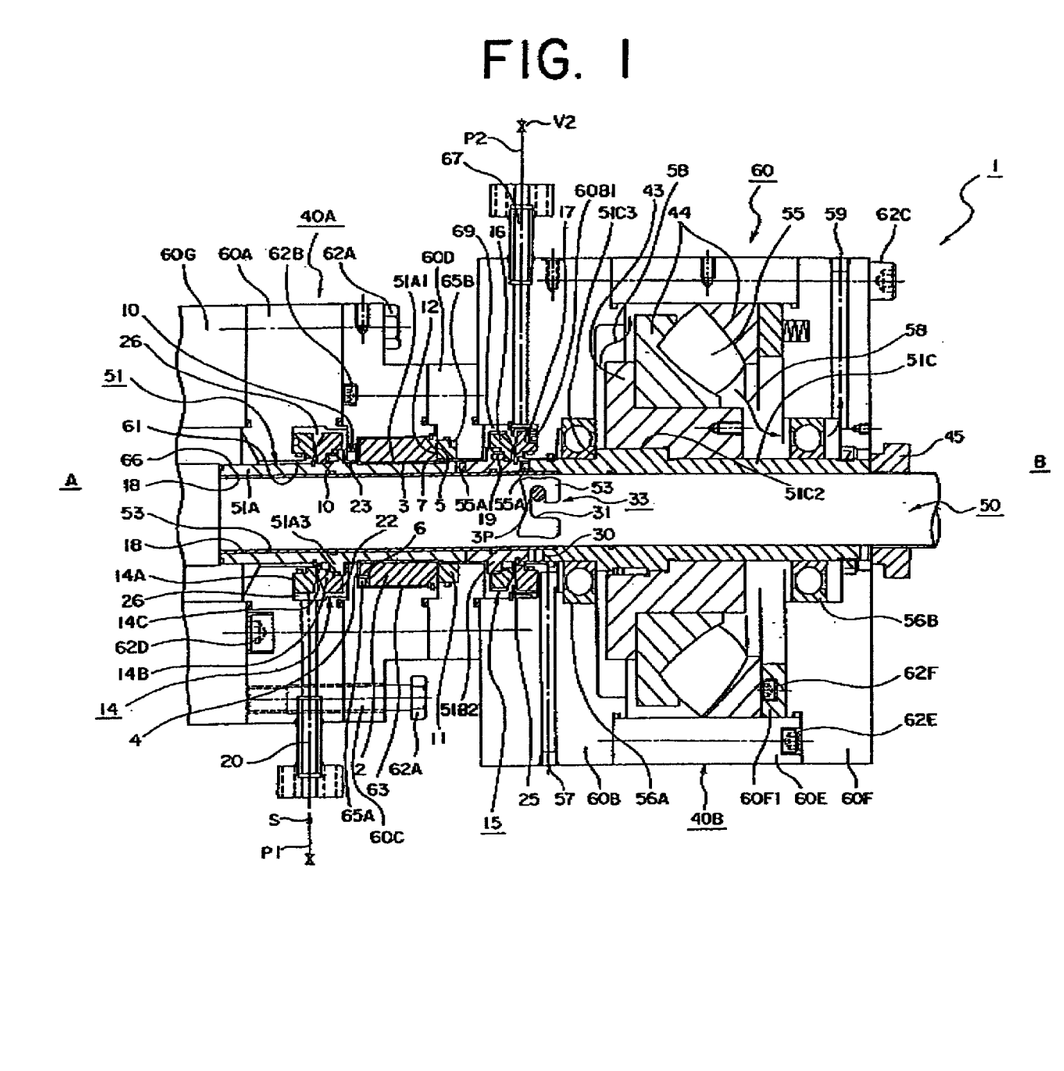
FIG. 1 is a cross sectional view of a shaft seal device as a first embodiment according to the present invention.

In FIG. 1 (also referred to FIG. 2), a housing 60 disposes a through hole 61 through which a rotary shaft 60 extends. The housing 60 is divided, depending on sealing locations, into a first housing 60A, a second housing 60B, a third housing 60C, and a fourth housing 60D. The third housing 60C and the fourth housing 60D are connected by a screw bolt 62B. Furthermore, the third housing 60C and the fourth housing 60D are connected, together with the first housing 60A, to the second housing 60B in an integral manner by means of a screw bolt 62D.

Further to the right of the figure are disposed a cylindrical fifth housing 60E and a sixth housing 60F which is an end cover. The fifth housing 60E and the sixth housing 60F are secured to the second housing 60B by means of a screw bolt 62C. A support ring 60F1 is connected to the sixth housing 60F by a screw bolt 62F. Also the fifth housing 60E is connected to the second housing 60B by a screw bolt 62E.

The whole housing unit 60 (60A, 60B, 60C, 60D, 60E, 60F) is secured by means of screw bolts 62A to a housing 60G of a main apparatus body.

A seal housing 40A is constituted such that a mechanical seal is installed inside including the first housing 60A, the second housing 60B, the third housing 60C and the fourth housing 60D. Also the fifth housing 60E and the sixth housing 60F define a bearing housing 40B which contains bearings 56A, 56B and a thrust bearing (the whole bearing assembly is referred to a bearing unit).

The seal housing 40A (60A, 60B, 60C, 60D) and the bearing housing 40B (60E, 60F) constitute the whole housing 60.

The through hole 61 of the housing 60 defines an interior portion 66 in the interior A side of the apparatus body. An installation chamber 26 for a first seal is defined as an inner circumferential groove disposed within the first housing 60A, and the installation chamber 26 communicates the interior portion 66 through a gap. Within the first seal installation chamber 26 is located a first seal portion 14. The first seal portion 14 constitutes a mechanical seal. A different kind of seal device being comprised of multiple parts such as a segment seal may replace the mechanical seal.

The first mechanical seal 14 comprises a stationary seal ring 14A and a rotary seal ring 14B. The stationary seal ring 14A is retained in a nonrotatable manner by sealingly fitting the ring to a protrusion 60A1 which is disposed on the inner surface of the housing 60.

The rotary seal ring 14B, on the other hand, mates with an outer diameter 51A3 of a first sleeve 51A in a nonrotatable but axially urging manner. Seal faces of the stationary seal ring 14A and the rotary seal ring 14B provide a secure seal at a sliding face 14C against a process fluid.

An intake passage 20 communicates with the first seal installation chamber 26 at the atmospheric side B relative to the installation chamber. This intake passage 20 may be directly communicated to a communication passage 22 which is located between the first seal installation chamber 26 and a fluid chamber 63. Also toward the fluid chamber 63 relative to the communication passage 22, a gap 23 which is narrower than the communication passage 22 is located between the rotary shaft 50 and the through hole 61 of the housing 60.

A sealant S which is a hydraulic fluid such as salad oil is provided from this intake passage 20. Pressure of the hydraulic fluid is chosen to be similar to or a little lower than that of the sealed process fluid, e.g., lower than the process fluid pressure by from 0.05 to 0.8 MPa.

The pressure differential of the sealant S whose pressure is set lower than the process fluid pressure necessarily falls within the designed sealing pressure limit. Keeping the pressure differential under the sealing pressure limit helps prevent the first seal portion 14 from being damaged by the pressure of the process fluid.

Furthermore, the fluid chamber 63 is located to the atmospheric side B relative to the communication passage 22. Inside the fluid chamber 63, a first fixture pin 65A is secured at the end face closer to the device interior 66 while a second fixture pin 65B is fixedly located at the end face closer to the atmospheric side B. In addition, a second seal installation chamber 69 is located in an annular groove in the atmospheric side B relative to the fluid chamber 63.

The housing 60 also disposes an outlet passage 67 communicating with the second seal installation chamber 69.

This outlet passage 67 further communicates with a second pipe fitting P2 which is connected to the housing 60. Downstream relative to the second pipe fitting P2 is located an accumulation tank via a valve V2, which is not shown in the figure. The accumulation tank then is connected to a pump via the second pipe fitting P2. Sealant S whose pressure is reduced by a floating ring 2, which will be described later in details, is fed to the accumulation tank for a temporary storage via the outlet passage 67 and the second pipe fitting P2.

This sealant S, pumped up to a pressure P1 by means of the pump, is fed back from the accumulation tank to the intake passage 20 via the first pipe fitting P1.

The pressure of the sealant S is decreased indeed in the aforementioned manner while passing through the fluid chamber 63, and the pressure of the sealant S, on the other hand, is delivered at 40 MPa from the intake passage 20 into the first seal installation chamber 26 and then is transmitted into the fluid chamber 63 via the next communication passage 22. The pressure of the sealant S is reduced at the gap 23 of the communication passage 22 as well.

The floating ring 2 which is described later reduces the pressure of the sealant S from P1, 40 MPa say, to 0.1 MPa to 3 MPa when passing through the fluid chamber 63.

Effect of the pressure reduction is even more significant with a higher viscosity of the sealant S. Therefore, such a high viscosity may help decrease the flow rate of the sealant S. Also narrowing a pressure reduction gap 7 between the floating ring 2 and the rotary shaft 50 will result in more significant pressure reduction effect.

The aforementioned floating ring 2 is disposed within the fluid chamber 63 and its inner diameter surface defines a pressure reduction inner surface 3. The pressure reduction gap 7 is located between the pressure reduction inner surface 3 of the floating ring 2 and the outer diameter surface 51A1 of a first sleeve 51A which is fitted over the rotary shaft 50. This pressure reduction gap 7 exhibits a pressure reduction effect according to the axial length of the floating ring 2 as well as the viscosity and flow rate of the sealant S.

Use of a labyrinth seal on the pressure reduction inner surface 3, to be described later accompanied with an example, can enhance the pressure reduction effect. A labyrinth seal disposed on the pressure reduction inner surface 3 helps to decrease the axial length of the floating ring 2, which will in turn lead to a more compact design of the whole shaft seal device. Furthermore, making the pressure reduction inner surface 3 a tapered surface will intensify the pressure reduction effect.

The size of the diameter of the floating ring 2 also has an influence on the pressure reduction effect.

Design of the floating ring 2 is conducted by taking these data into account. Dimension of the pressure reduction gap 7 between the floating ring 2 and the rotary shaft 50 falls in a range of from 0.01 mm to 0.5 mm, more preferably in a range of from 0.05 mm to 0.2 mm.

The floating ring 2 has an opposing end face 4, which is located to the inlet side where the sealant S flows in, being adjacent to the end face of the fluid chamber 63. Also the other end face of the floating ring 2, being closer to the atmospheric side B, defines a seal face 5. This seal face 5 forms a sealing contact with an opposing seal face 12 of a stationary ring 11 by being urged by a plurality of coil springs 10 which are arranged in a circumferential direction between the end face of the fluid chamber 63 and the opposing end face 4.

Furthermore, the opposing end face 4 disposes a first mating concave 6, and mating of the first mating concave 6 with the first fixture pin 65A retains the floating ring 2 in nonrotatable manner relative to the rotary shaft 50. And the floating ring 2 is retained in a radially movable manner relative to the first sleeve 51A.

The stationary ring 11 is disposed to the atmospheric side B relative to the floating ring 2. This stationary ring 11 has a second mating concave on the end face which is on the other side of the opposing seal face 12, and the second mating concave mates with the second fixture pin 65B. The stationary ring 11 is a part of the floating ring 2, and a gap between the stationary ring 11 and the first sleeve 51A is arranged more or less equal to the pressure reduction gap 7 of the floating ring 2. Any metal which possesses a sufficient strength can be used for the floating ring 2 and the stationary ring 11, e.g., SiC ceramics or super hard alloys. The seal face 5 is not allowed to rotate relative to the opposing seal face 12, being allowed for a minor radial displacement alone.

A second seal portion 15 is disposed in the second seal installation chamber 69 which is located to the atmospheric side B relative to the floating ring 2. The second seal portion 15 constitutes a mechanical seal.

This mechanical seal 15 seals the sealant S by a sealing contact of the seal face 16A of the rotary seal ring 16 and the opposing seal face 17A of the stationary seal ring 17.

On the outer diameter surface of the second seal installation chamber 69, a dam 25 is disposed to cool the relative sliding surface between the seal face 16A and the opposing seal face 17A. The sealant S coming in from the direction of the floating ring 2 is guided by the dam 25 towards the mechanicals seal 15 for a close contact to cool down the friction heat which is generated between the seal face 16A and the opposing seal face 17A.

As an alternative example for the second seal portion 15, a seal device generally known as a segment seal can be disposed in the second sleeve 51B in which the segment seal comprises a carbon seal ring with a square section, a cover ring connected to the outer diameter surface of the seal ring, and a garter spring fitted over the outer diameter surface of the cover ring. The second seal portion 15 prevents the sealant S from leaking through the second seal portion to the atmosphere B, in which a pressure of the sealant S is reduced by the floating ring 2.

A sleeve 51 is fitted over the rotary shaft 50. This sleeve 51 comprises three components; a first sleeve 51A, a second sleeve 51B and a third sleeve 5C. The first sleeve 51A of the three has a surface treatment on its outer diameter surface 51A1 such as a surface quenching, resin coating or metal coating. The coated layer 51A2 of the first sleeve 51A which is also surface treated exhibits a durability against a sliding movement relative to the floating ring 2.

The second sleeve 51B is disposed to the atmospheric side B relative to the end face of the first sleeve 51A. The second sleeve 51B retains the rotary seal ring 16 such that the seal ring 16 rotates together with the rotary shaft 50. Furthermore, the third sleeve 51C is fitted over the rotary shaft 50 in the atmospheric side B relative to the end face of the second sleeve 51B. In addition, the inner diameter surfaces 18 of the first sleeve 51A and the second sleeve 51B and a part of the inner diameter surface 18 of the third sleeve 51C fit over the outer diameter surface of a fixed sleeve 53, and the inner diameter surface of the sleeve 53 is fitted over the rotary shaft 50. Length of the fixed sleeve 53 may be enlarged so that more than a half portion of the inner diameter surface 18 of the third sleeve 51C in the axial direction is fitted over the fixed sleeve 53.

A plurality of concaves located in the end face of the first sleeve 51A are matingly connected with drive pins 55A disposed at the opposing end face of the second sleeve. Likewise, similar concaves disposed in the end face of the second sleeve 51B matingly connect with drive pins 55A disposed at the opposing end face of the third sleeve, by which these parts are connected in a tandem manner. This connection can also be realized by reversing the positional relation of the concaves and the drive pins, namely drive pins 55A located at the end face of the first sleeve 51A and concaves in the end face of the second sleeve. The first, second and third sleeves, respectively 51A, 51B, 51C, have annular grooves disposed in the inner diameter surfaces for installing O-rings. The O-rings installed in the grooves tightly seals the interfaces between the sleeves and the fixed sleeve 53 or the rotary shaft 50.

Drive pins fixedly connected to the large diameter portion 51B2 of the second sleeve 51B mate with the concaves of the rotary seal ring 16 so that the rotary seal ring 16 and the rotary shaft 50 rotate together. The rotary seal ring 16 is urged towards the stationary seal ring 16 by means of a plurality of coil springs which are disposed in the large diameter portion 51B2. The pressure reduced sealant S coming in from the direction of the floating ring 2 is sealed by the sealing contact formed by the seal face 16A of the rotary seal ring 16 and the opposing seal face 17A of the stationary seal ring 17.

The pressure reduced sealant S coming in from the direction of the floating ring 2 is sealed by the sealing contact formed by the seal face 16A of the rotary seal ring 16 and the opposing seal face 17A of the stationary seal ring 17.

An installation ring 43 is fitted over the outer diameter step shoulder 51C2 of the third sleeve 53. A thrust bearing 55 is installed via a bearing housing 44 by an installation ring 43 and a support ring 60F1. The thrust bearing 55 exhibits a strong support for the first seal portion 14, the second seal portion 15, the floating ring 2 and so on which are subjected to a high pressure exerted by the sealed process fluid or the sealant S.

Furthermore, a bearing 56A, being retained by a snap ring and the end face 51C3 of the outer diameter step shoulder 51C2, is fitted to a second housing 60B and the inner diameter surface 18 of the third sleeve 51C while the bearing 56A supports the rotary shaft 50 in a rotatable manner. Similarly, a bearing 56B is fitted to the inner diameter surface of a sixth sleeve 51F and the outer diameter surface of the third sleeve 51C, supporting the rotary shaft 50 in a freely rotatable manner.

L-shaped mating hole 31 is disposed at the end portion of the fixed sleeve 53. The shape of the mating hole 31 is not necessarily limited to L-shaped, but any shape will do, e.g., circular or triangular, as long as the mating hole 31 mates with the mating pin 30 in a freely detachable manner.

The mating pin 30 mating with the mating hole 31 is fitted to a hole located at the end face of the third sleeve 51C. The mating pin 30 has a mating portion 30A which actually mates with the mating hole 31. In addition, this mating pin 30 may be disposed in the fixed sleeve 53. The mating hole can also be disposed in the third sleeve 51C. The mating pin 30 and the mating hole 31 can be located in either sleeve for the same effect. When a fourth and a fifth sleeves are introduced as well as the third sleeve 51C, mating pins or mating holes are to be prepared on respective sleeves towards the fixed sleeve 53.

The mating pin 30 and the mating hole 31 constitute a connecting means 33 for the second sleeve 51B and the third sleeve 51C.

The connecting means 33 can be assembled as follows. The stationary seal ring 14A is assembled to the first housing 60A. The rotary ring also is fitted over the first sleeve 51A. Next, the floating ring 2 is installed in the fluid chamber 63 between the third housing 60C and the fourth housing 60D. These two housings 60C, 60D then are connected by screw bolts 62B. The rotary seal ring 16 is fitted over the second sleeve 51B. The stationary seal ring 17 is assembled to the second housing 60B next. The bearing 56A is then installed between the outer diameter surface of the third sleeve 51C and the inner diameter surface of the second housing 60B. Furthermore, the inner diameter surface 18 of the first sleeve 51A and the second sleeve 51B is fitted over the fixed sleeve 53, and the drive pin 55A of the second sleeve 51B is mated with the concave 51B1 of the first sleeve 51A. The first housing 60A, the third housing 60C and the fourth housing 60D are connected to the second housing 60B by means of screw bolts 62D. This connection concludes the assembly of the seal housing 40A.

The fifth housing 60E and the second housing 60B are tied with screw bolts 62E. The bearing housing 44 of the thrust bearing 55 is fitted to the installation ring 43, and the installation ring 43 then is fitted over the third sleeve 51C.

The bearing 56B is fitted to the inner diameter surface of the sixth housing 60F, and the support ring 60F1 is mounted on the side surface of the housing by screw bolts 62F. The six housing 60F and the fifth housing 60E, retaining the thrust bearing 55 therebetween, are joined with the second housing 60B by means of screw bolts 62C. The mating pin 30 of the third sleeve 51C is inserted to the mating hole of the fixed sleeve 53 along the axial direction and the sleeve 51C is rotated about the axis to lock the connecting means 33.

The seal housing 40A, in which respective seals are disposed, and the bearing housing 40B, in which the bearings 56A, 56B and the thrust bearing 55 are installed, constitutes the whole housing 60, which in turn is assembled to the mechanical seal device 1. This mechanical seal device 1 is fitted over the rotary shaft 50 and is tied to the housing 60G of the main apparatus body by screw bolts 62A. The sleeve 51 and the fixed sleeve 53 are fastened by the fastening nut 45 between the nut and a step shoulder of the rotary shaft 50.

Use of the floating ring 2 with a pressure reduction effect between the first seal portion 14 and the second seal portion 15 enables it to securely seal a process fluid with two seal portions instead of multi-step seal means. This helps reduce the size as well as the assembly cost.

The entire shaft seal device 1 are divided into two blocks; seal housing 40A and bearing housing 40B. Easy assembly of the seal housing 40A and the bearing housing 40B by the connecting means 33 not only simplifies the assembly of the shaft seal device 1, but also makes the device compact. A production cost of the shaft seal device 1 will be reduced accordingly.

Figure 2:
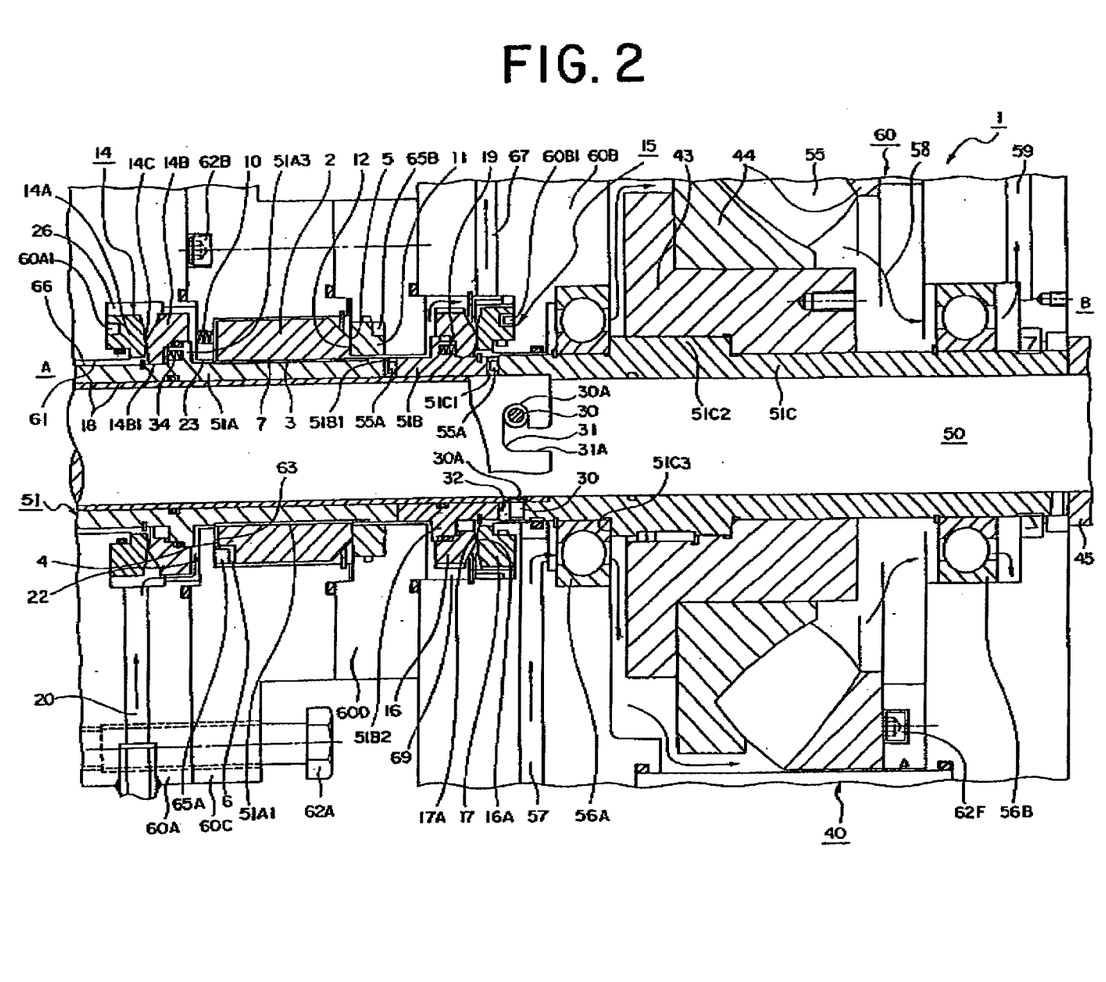
FIG. 2 is a cross sectional view of a portion of a shaft seal device as a second embodiment according to the present invention.

FIG. 2 is an enlarged cross-sectional view of a portion of the shaft seal device 1 shown in FIG. 1 as a second embodiment according to the present invention. That is, the symbols which are used in FIG. 1 and FIG. 2 are common, and detailed explanations previously given for FIG. 1 are applicable for the identical symbols which appear in FIG. 2.

In the shaft seal device 1 shown in FIG. 2, a seal housing 40A and a bearing housing 40B are joined by a connecting means 33 in which the connecting means 33 comprises a mating hole 31 which is located at the end of a fixed sleeve 53 and a mating pin 30 which is installed at the end of the third sleeve 51C.

The mating hole 31 has an inlet 31A to which the mating pin 30 is inserted. The mating pin 30 also retains a mating portion 30A at its head which forms a mating connection with the mating hole 31.

The mating pin 30 is inserted into the inlet 31A of the mating hole 31 in the fixed sleeve 53 and the third sleeve 51C is rotated to complete the mating.

In the second embodiment example, the connecting means 33 is disposed in the second sleeve 51B and the third sleeve 51C. In case of absence of the third sleeve 51C, however, the connecting means 33 is disposed in the first sleeve 51A and the second sleeve 51B. Furthermore, if a fourth sleeve 51 or/and a fifth sleeve are employed in addition to the first sleeve 51A, the second sleeve 51B and the third sleeve 51C, the connecting means 33 is additionally disposed at the joint of the third sleeve 51C and the fourth sleeve or at the joint of the fourth sleeve and the fifth sleeve.

Seal ability of the aforementioned arrangement will be described below.

Pressure of the sealant S is reduced by the pressure reduction gap 7 located between the floating ring 2 and the first sleeve 51A. As an example, the pressure of the sealant S is 65 MPa.

Also the flow rate is in a range of from 10 to 15 liter per minute, while the dimension of the pressure reduction gap 7 is in a range of from 0.05 to 0.2 mm (the dimension, from 0.05 to 0.2 mm, has been confirmed to be effective, but an ideal dimension is determined based on the pressure, viscosity and flow velocity of the sealant S, the axial length and diameter of the floating ring 2, the shape of the labyrinth seal and so on).

Experimental results using the shaft seal device 1 of the current arrangement showed that the pressure was reduced from 65 MPa in the intake passage 20 to 3 MPa in the outlet passage 67. No leakage of the sealant S from the second seal portion 15 was observed. Furthermore, neither deformation nor defect was observed and its seal ability is considered to be good.

The third sleeve 51C is supported by the bearing 56A, 56B which are mounted in the housing 60. The third sleeve 51C sustains an axial force by means of the thrust bearing 55 via bearing housing 44. This thrust bearing 55 is retained by an installation ring 43, which mates with the third sleeve 51C, and a support ring 60F1, which is installed in the sixth housing 60F. The bearing 55 then sustains the pressure due to the process fluid and the sealant S along the axial direction.

A lubricant L is provided from a supply passage 57 to lubricate the bearings 56A, 56B and the thrust bearing 55. This supply passage 57 is communicated to the atmosphere B side relative to the second seal portion 15 in the second seal installation chamber 69. Furthermore, the housing 60 disposes a circulation passage 58 through which the lubricant L is delivered from the second seal installation chamber 69, the bearings 56A, 56B, and the thrust bearing 55 towards an ejection passage 59. The lubricant ejected from the ejection passage 59 is led to a circulation system for a purification purpose which is not shown in the figure before being fed back by pressure to the supply passage 57 again.

Lubricant provided from the supply passage 57 not only lubricates but also cools down the mechanical seal 15 of the second seal portion, the bearings 56A, 56B and the thrust bearing 55. Pressure of the lubricant L flowed into the second seal installation chamber 69 resists the pressure of the sealant S via the second seal portion 15, which provides the second seal portion 15 with an anti-pressure ability and prevents the sealant S from leaking. Therefore, the second seal portion 15 does not require an advanced sealing function and this will yield a less production cost.

Yet another type of invention will be described next. A preferred shaft seal device 1 according to a third invention retains a connecting means 33 comprising mating pins 30 and mating holes 31 for an anti-rotation mechanism where the mating pins 30 are disposed in either the third sleeve 51C or the fixed sleeve 53 while the mating holes 31 are in either the fixed sleeve 53 or the third sleeve 51C.

In the shaft seal device 1 related to the third invention, the connecting means 33 disposes the mating pins on one sleeve and the mating holes on the other. Therefore, mating of the pins 30 and the holes 31 will simplify the installation of the shaft seal device 1.

Finally, practical effects of the present invention will be explained.

According to the shaft seal device 1 related to the present invention, fitting the inner diameter surfaces of the first sleeve 51A and the second sleeve 51B over the fixed sleeve 53 and joining the second sleeve 51B with the fixed sleeve 53 by means of the connecting means 33 not only fittingly join the fixed sleeve 53, the first sleeve 51A and the second sleeve 51B, bus also constitute the shaft seal device 1 as an integral piece block where the first seal portion 14 and the second seal portion 15 are disposed inside between the sleeve 51 and the housing 60.

Further fitting of the inner diameter surface of the shaft seal device 1 over the rotary shaft 50 will conclude the assembly of the shaft seal device 1. This will lead to a decrease in the fabrication cost as well as a significant simplification of the assembly process of the shaft seal device 1.

In addition, in case of a disassembly of the shaft seal device 1 due to a failure or maintenance, releasing the connecting means 33 will disengage the first sleeve 51A from the second sleeve 51B, and this will make possible to disassemble the first seal portion 14 and the second seal portion 15.

This simple, joint structure will make the shaft seal device 1 compact, hence a low fabrication cost.

The shaft seal device 1, equipped with the floating ring 2 for reducing a pressure, is constituted by minimal numbers of seal portions. Therefore, the device 1 has an excellent seal ability against a high pressure process fluid, and it not only results in a compact structure but also yields an easy assembly.

Also as the seal housing 40A and the bearing housing 40B can be joined as an integral part, its assembly to a main apparatus body is simplified and the related assembly cost will be reduced accordingly.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A shaft seal device for providing a process fluid between a housing and a rotary shaft, said shaft seal device comprising:

a) a first seal portion being located inwardly relative to an apparatus and comprising a first stationary seal ring retained in said housing and a first rotary seal ring for making a sealing engagement relative to said first stationary seal ring;

b) a first sleeve having a large diameter surface by which said first rotary seal ring is retained;

c) a second sleeve having a large diameter surface and being located on the opposite side of said process fluid relative to said first sleeve;

d) a second seal portion which comprises a second rotary seal ring retained in said large diameter surface of said second sleeve and a second stationary ring to form a sealing engagement relative to said second rotary seal ring;

e) a fixed sleeve having an outer diameter surface and an inner diameter surface in which said outer diameter surface is fitted with said inner diameter surface of said first sleeve and said second sleeve and said inner diameter surface is fitted over said rotary shaft; and f) a connecting means being disposed, respectively, in said fixed sleeve and said second sleeve by which the two sleeves are joined relative to each other, wherein the first seal portion is arranged in a first seal installation chamber formed in the housing, the second seal portion is arranged in a second seal installation chamber formed in the housing, pressurized sealant fluid is introduced via the first installation chamber into a sealed fluid chamber disposed between the first seal portion and the second seal portion along the rotary shaft, and both of the first rotary seal ring and the second rotary seal ring are disposed in a manner for facing the sealed fluid chamber.

2. The shaft seal device according to claim 1 wherein said connecting means comprises a mating pin and a mating hole, said mating pin or said mating hole being disposed on said sleeve which is adjacent to said fixed sleeve, said mating hole or said mating pin being disposed on said fixed sleeve.

3. The shaft seal device according to claim 1, wherein a pressure of the sealant fluid before being introduced into the first seal installation chamber is equal to or less than that of the sealed process fluid.

4. The shaft seal device according to claim 3, wherein the sealed fluid chamber is configured so the pressure of the sealant fluid is reduced while passing through the sealed fluid chamber from the first seal installation chamber to the second seal installation chamber.

5. The shaft seal device according to claim 4, wherein the sealant fluid has a relatively high viscosity.

6. The shaft seal device according to claim 3, wherein the sealant fluid has a relatively high viscosity.

7. A shaft seal device for providing a process fluid between a housing and a rotary shaft, said shaft seal device comprising:
   a) a first seal portion being located inwardly relative to an apparatus which contains a fluid and comprising a first stationary seal ring retained in said housing and a first rotary seal ring for making a sealing engagement relative to said first stationary seal ring;
   b) a first sleeve having a large diameter surface by which said first rotary seal ring is retained;
   c) a second sleeve having a large diameter surface and being located in the opposite side of said process fluid relative to said first sleeve;
   d) a second seal portion comprising a second rotary seal ring retained in said large diameter surface of said second sleeve and a second stationary ring to form a sealing engagement relative to said second rotary seal ring;
   e) a floating ring being located within a sealed fluid chamber between said first seal portion and said second seal portion for reducing a pressure;
   f) a third sleeve being located in the opposite side of said process fluid relative to said second sleeve and supporting a bearing;
   g) a fixed sleeve having an outer diameter surface and an inner diameter surface, said outer diameter surface being fitted with inner diameter surfaces of said first sleeve and said second sleeve and said third sleeve and said inner diameter surface of said fixed sleeve being fitted over said rotary shaft; and
   h) a connecting means being disposed, respectively, in said fixed sleeve and said second sleeve by which the two sleeves are joined relative to each other, wherein the first seal portion is arranged in a first seal installation chamber formed in the housing, the second seal portion is arranged in a second seal installation chamber formed in the housing, pressurized sealant fluid is introduced via the first installation chamber into the sealed fluid chamber disposed between the first seal portion and the second seal portion along the rotary shaft, and both of the first rotary seal ring and the second rotary seal ring are disposed in a manner for facing the sealed fluid chamber.

8. The shaft seal device according to claim 7 wherein said connecting means comprises a mating pin and a mating hole, said mating pin or said mating hole being disposed on said sleeve which is adjacent to said fixed sleeve, said mating hole or said mating pin being disposed on said fixed sleeve.

9. The shaft seal device according to claim 7, wherein a pressure of the sealant fluid before being introduced into the first seal installation chamber is equal to or less than that of the sealed process fluid.

10. The shaft seal device according to claim 9, wherein the sealed fluid chamber is configured so the pressure of the sealant fluid is reduced while passing through the sealed fluid chamber from the first seal installation chamber to the second seal installation chamber.

11. The shaft seal device according to claim 10, wherein the sealant fluid has a relatively high viscosity.

12. The shaft seal device according to claim 9, wherein a pressure reduction gap is formed between the floating ring and the first sleeve, the pressure of the sealant fluid is reduced while passing through the pressure reduction gap from the first seal installation to the second seal installation chamber.

13. The shaft seal device according to claim 12, wherein the sealant fluid has a relatively high viscosity.

14. The shaft seal device according to claim 9, wherein the sealant fluid has a relatively high viscosity.

* * * * *